United States Patent
Lee

(10) Patent No.: US 12,347,842 B2
(45) Date of Patent: Jul. 1, 2025

(54) BATTERY MODULE HAVING STRUCTURE CAPABLE OF RAPID PREHEATING, BATTERY PACK COMPRISING SAME, AND VEHICLE COMPRISING SAME

(71) Applicant: LG Chem, Ltd., Seoul (KR)

(72) Inventor: Jeong-Seop Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 966 days.

(21) Appl. No.: 17/281,446

(22) PCT Filed: Mar. 23, 2020

(86) PCT No.: PCT/KR2020/003957
§ 371 (c)(1),
(2) Date: Mar. 30, 2021

(87) PCT Pub. No.: WO2020/230998
PCT Pub. Date: Nov. 19, 2020

(65) Prior Publication Data
US 2022/0006142 A1    Jan. 6, 2022

(30) Foreign Application Priority Data

May 15, 2019  (KR) .......................... 10-2019-0057047

(51) Int. Cl.
*H01M 10/6569*  (2014.01)
*B60L 50/64*    (2019.01)
(Continued)

(52) U.S. Cl.
CPC ......... *H01M 10/6569* (2015.04); *B60L 50/64* (2019.02); *H01M 10/615* (2015.04); *H01M 10/625* (2015.04); *H01M 10/647* (2015.04); *H01M 10/6595* (2015.04); *H01M 50/209* (2021.01); *H01M 50/249* (2021.01); *H01M 50/271* (2021.01); *H01M 50/50* (2021.01);
(Continued)

(58) Field of Classification Search
CPC ........... B60L 50/64; B60L 58/27; B60L 58/24
See application file for complete search history.

(56) References Cited

U.S. PATENT DOCUMENTS 4,117,882 A * 10/1978 Shurcliff ................. F28D 20/02
126/609
2008/0251063 A1  10/2008 Palena et al.
(Continued)

FOREIGN PATENT DOCUMENTS

CH        262790 A    7/1949
CN     103299477 A    9/2013
(Continued)

OTHER PUBLICATIONS

KR2018121723A_Machine translation (Year: 2018).*
(Continued)

*Primary Examiner* — Jonathan G Leong
*Assistant Examiner* — Aryana Y. Ortiz
(74) *Attorney, Agent, or Firm* — Lerner David LLP

(57) ABSTRACT

A battery module includes a cell stack having a plurality of battery cells; and a phase change preheater disposed on the cell stack. The phase change preheater contains a phase change material that causes a phase change as crystal nuclei are formed, and accordingly causes an exothermic reaction.

19 Claims, 6 Drawing Sheets

(51) Int. Cl.
*B60L 58/27* (2019.01)
*H01M 10/615* (2014.01)
*H01M 10/625* (2014.01)
*H01M 10/647* (2014.01)
*H01M 10/6595* (2014.01)
*H01M 50/105* (2021.01)
*H01M 50/209* (2021.01)
*H01M 50/211* (2021.01)
*H01M 50/249* (2021.01)
*H01M 50/271* (2021.01)
*H01M 50/296* (2021.01)
*H01M 50/50* (2021.01)
*H01M 50/507* (2021.01)

(52) U.S. Cl.
CPC ........... *H01M 50/507* (2021.01); *B60L 58/27* (2019.02); *H01M 50/105* (2021.01); *H01M 50/211* (2021.01); *H01M 50/296* (2021.01); *H01M 2220/20* (2013.01)

(56) References Cited

U.S. PATENT DOCUMENTS

| | | | |
|---|---|---|---|
| 2011/0293986 | A1 | 12/2011 | Kozu |
| 2014/0004394 | A1* | 1/2014 | Kerkamm ........... H01M 10/615 429/50 |
| 2014/0038009 | A1 | 2/2014 | Okawa et al. |
| 2015/0311572 | A1 | 10/2015 | Sung et al. |
| 2016/0023070 | A1 | 1/2016 | Wolfe et al. |

FOREIGN PATENT DOCUMENTS

| | | | | | |
|---|---|---|---|---|---|
| CN | 205488415 | U | * | 8/2016 | |
| CN | 205863333 | U | | 1/2017 | |
| CN | 107048655 | A | | 8/2017 | |
| EP | 2993435 | B1 | * | 8/2017 | ........... F28D 1/0341 |
| EP | 3254331 | A1 | | 12/2017 | |
| JP | 3516988 | B2 | * | 4/2004 | ........... F28D 20/028 |
| JP | 2005141929 | A | | 6/2005 | |
| JP | 2011094878 | A | * | 5/2011 | ............. F28D 20/02 |
| JP | 2012226895 | A | | 11/2012 | |
| JP | 2014503973 | A | | 2/2014 | |
| JP | 2018111162 | A | | 7/2018 | |
| KR | 20080093572 | A | | 10/2008 | |
| KR | 20090104930 | A | | 10/2009 | |
| KR | 20110084959 | A | | 7/2011 | |
| KR | 20120014363 | A | | 2/2012 | |
| KR | 101340365 | B1 | | 12/2013 | |
| KR | 20150015216 | A | | 2/2015 | |
| KR | 20150062783 | A | | 6/2015 | |
| KR | 101553081 | B1 | | 9/2015 | |
| KR | 2018121723 | A | * | 11/2018 | ........ H01M 10/4264 |
| KR | 20190036245 | A | | 4/2019 | |
| WO | WO-2018159928 | A1 | * | 9/2018 | ............. F16M 11/22 |

OTHER PUBLICATIONS

WO2018159928A1_Machine translation (Year: 2018).*
CN205488415U_Machine translation (Year: 2016).*
JP2011094878A_Machine translation (Year: 2011).*
JP3516988B2_Machine translation (Year: 2004).*
EP2993435B1 Machine translation (Year: 2017).*
Indian Examination Report including Written Opinion for Application No. 202117032162 mailed Jan. 12, 2023, pp. 1-6.
Search Report dated Aug. 21, 2023 from the Office Action for Chinese Application No. 202080005054.0 issued Aug. 24, 2023, 3 pages.
International Search Report for Application No. PCT/KR2020/003957 dated Jul. 21, 2020.

* cited by examiner

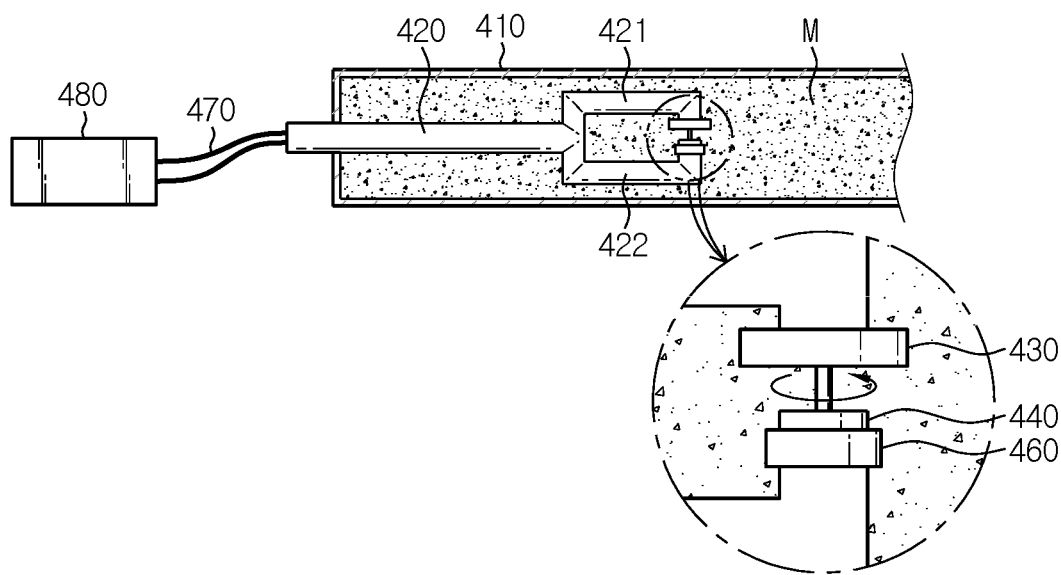
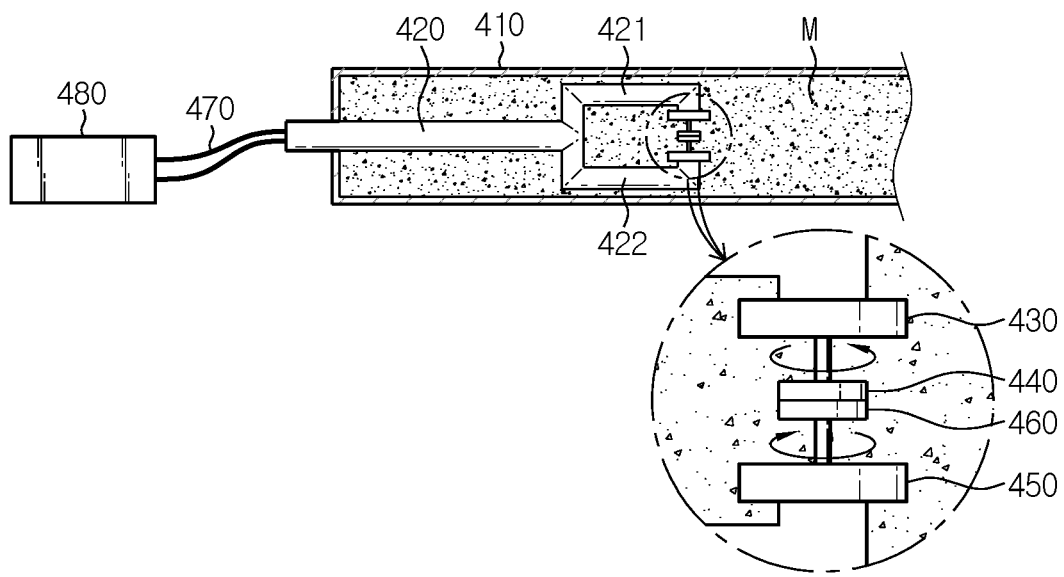

BATTERY MODULE HAVING STRUCTURE CAPABLE OF RAPID PREHEATING, BATTERY PACK COMPRISING SAME, AND VEHICLE COMPRISING SAME

CROSS-REFERENCE TO RELATED APPLICATIONS

The present application is a national phase entry under 35 U.S.C. § 371 of International Application No. PCT/KR2020/003957 filed on Mar. 23, 2020, which claims priority from Korean Patent Application No. 10-2019-0057047 filed on May 15, 2019, the disclosures of which are incorporated herein by reference.

TECHNICAL FIELD

The present disclosure relates to a battery module having a rapid preheating structure, and a battery pack and a vehicle including the battery module, and more particularly, to a battery module having a phase change preheater containing a material, which causes a phase change according to a crystal nucleus forming principle due to a physical impact, and a battery pack and a vehicle including the battery module.

BACKGROUND ART

Currently, the performance of a secondary battery is rapidly reduced under a certain temperature. This may cause problems when a vehicle employing the secondary battery such as a HEV, a PHEV and a BEV is used in countries where winter exists or which are relatively close to the polar region.

That is, when the temperature is low, if the temperature of the vehicle parked overnight decreases, the temperature of the secondary battery inside the vehicle also decreases, and thus the vehicle may not be easily started in the next morning. In addition, even when the vehicle is running, the low temperature greatly affects the life and performance of the battery.

It is possible to heat the secondary battery in advance by using a heater or the like before the vehicle is started. However, since the power supplied to the heater is also provided through the secondary battery, in a low temperature environment where the performance of the secondary battery is deteriorated, there is still the problem of the deteriorated performance of the secondary battery.

DISCLOSURE

Technical Problem

The present disclosure is designed to solve the problems of the related art, and therefore the present disclosure is directed to deriving the normal performance of a battery pack by quickly preheating the battery pack in advance through very low power consumption before a vehicle is used.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack having a plurality of battery cells; and a phase change preheater disposed on the cell stack and containing a phase change material that causes a phase change as crystal nucleus is formed and accordingly causes an exothermic reaction.

The phase change material may include at least one solution selected from a sodium hydroxide supersaturated solution, a sodium acetate supersaturated solution and a sodium thio sulfate supersaturated solution.

The phase change preheater may include a pouch placed on the cell stack; the phase change material contained in the pouch; a first driving unit located in the pouch; a first friction plate attached to the first driving unit; and a second friction plate configured to form metal crystal nucleus by causing friction with the first friction plate as the first driving unit is driven.

The phase change preheater may further include a connector located out of the pouch and electrically connected to the first driving unit.

The phase change preheater may further include a support frame provided through the pouch and configured to fix the first driving unit and the second friction plate.

The phase change preheater may include a pouch; the phase change material contained in the pouch; a first driving unit located in the pouch; a first friction plate attached to the first driving unit; a second driving unit located in the pouch; and a second friction plate attached to the second driving unit and configured to form metal crystal nucleus by causing a friction with the first friction plate as the first driving unit and the second driving unit are driven.

The phase change preheater may further include a connector located out of the pouch and electrically connected to the first driving unit and the second driving unit.

The phase change preheater may further include a support frame provided through the pouch and configured to fix the first driving unit and the second driving unit.

The battery module may further comprise a film heater disposed on the phase change preheater and connected to an external power source to heat the phase change preheater so that the phase change material phase-changed into a solid state is phase-changed into a liquid state again.

The battery module may further comprise a pair of bus bar frame assemblies including a pair of bus bar frames configured to cover one longitudinal end and the other longitudinal end of the cell stack and a plurality of bus bars fixed onto the bus bar frames and electrically connected to the battery cells.

The battery module may further comprise a module case configured to cover peripheries of the cell stack and the phase change preheater in a state where the bus bar frame assembly is exposed out.

The battery module may further comprise a pair of end plates configured to cover the bus bar frame assembly.

In another aspect of the present disclosure, there is also provided a battery pack, which comprises the battery module according to an embodiment the present disclosure as described above.

In another aspect of the present disclosure, there is also provided a vehicle, which comprises the battery module according to an embodiment the present disclosure as described above.

Advantageous Effects

According to an embodiment of the present disclosure, it is possible to quickly preheat a battery pack in advance through very low power consumption before a vehicle is used, thereby deriving the normal performance of the battery pack mounted to a vehicle.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

FIG. 5 is a diagram specifically showing an example of the phase change preheater employed by the battery module according to an embodiment of the present disclosure.

FIG. 6 is a diagram specifically showing another example of the phase change preheater employed by the battery module according to an embodiment of the present disclosure.

BEST MODE

Figure 1:
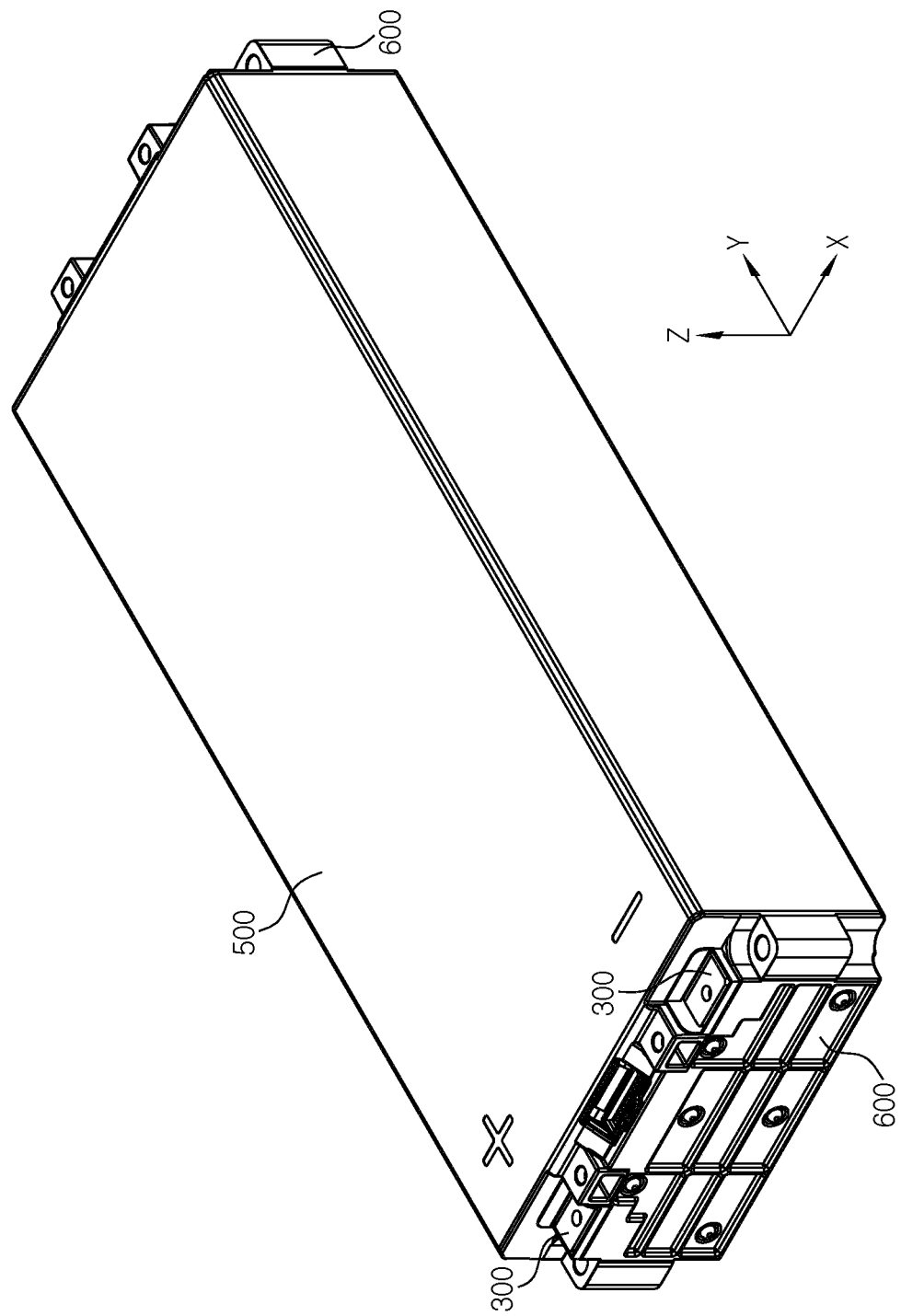
FIG. 1 is a perspective view showing a battery module according to an embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but rather interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustration only, not intended to limit the scope of the disclosure, so it should be understood that other equivalents and modifications could be made thereto without departing from the scope of the disclosure.

Referring to FIGS. 1 to 4, a battery module according to an embodiment of the present disclosure includes a cell stack 100, a bus bar frame assembly 200, an outer terminal 300, a phase change preheater 400, a module case 500 and an end plate 600.

Figure 2:
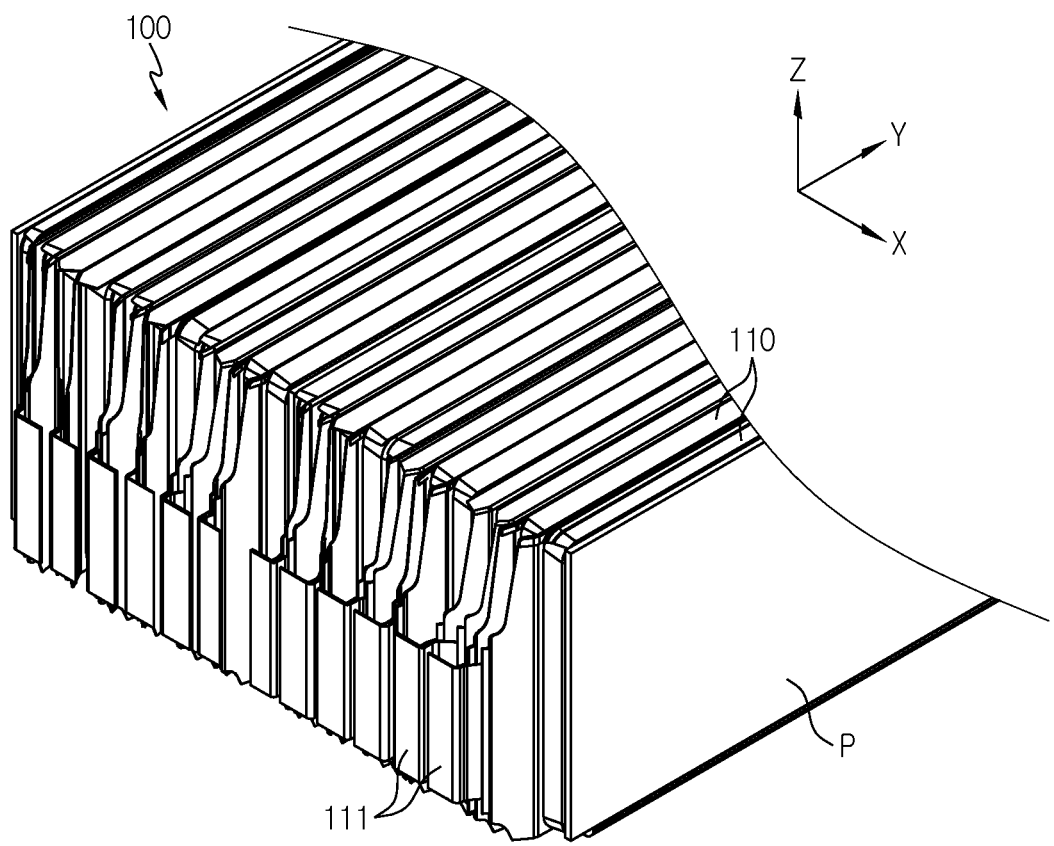
FIG. 2 is a perspective view showing a cell stack employed by the battery module according to an embodiment of the present disclosure.

As shown in FIG. 2, the cell stack 100 includes a plurality of battery cells 110 stacked such that their wide surfaces face each other. The cell stack 100 may include at least one buffer pad P interposed between an outermost battery cell 110 and/or neighboring battery cells 110.

That is, the cell stack 100 may be inserted into the module case 500 in a state of being coupled with the bus bar frame assembly 200, the outer terminal 300 and the phase change preheater 400. At this time, the buffer pad P made of an elastic material such as a sponge may be additionally applied so that the cell stack 100 has a maximized volume and is easily inserted.

A pouch-type battery cell may be utilized as the battery cell 110. The pouch-type battery cell 110 includes a pair of electrode leads 111 that are respectively drawn at both longitudinal ends.

Figure 3:
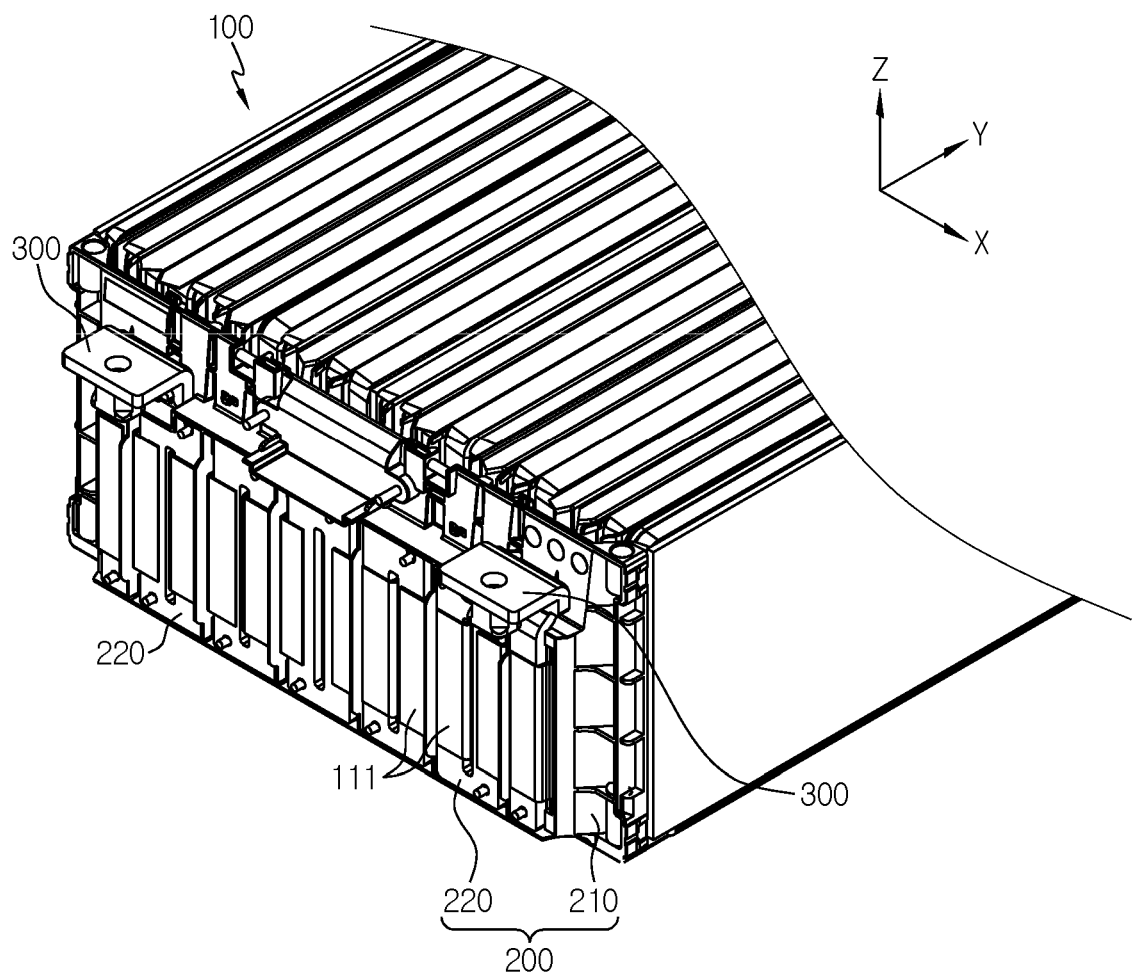
FIG. 3 is a perspective view showing a cell stack and a bus bar frame assembly employed by the battery module according to an embodiment of the present disclosure.

Referring to FIG. 3, the bus bar frame assembly 200 may include a bus bar frame 210 configured to cover one longitudinal side and the other longitudinal side of the cell stack 100 and a plurality of bus bars 220 fixed onto the bus bar frame 210 and electrically connected to the battery cell 110.

The bus bar frame 210, for example, may be made of a material with an insulating property such as resin. The bus bar frame 210 and the bus bar 220 have slits formed at positions corresponding to each other so that the electrode lead 111 may be drawn out. The electrode lead 111 drawn out through the slit is bent to come into close contact with the bus bar 220 and fixed to the bus bar 220 by welding or the like.

The outer terminal 300 is fixed onto the bus bar frame 210 and is connected to the electrode lead 111 located at both outermost sides of the cell stack 100 in a width direction (an X-axis direction in FIG. 3).

Figure 4:
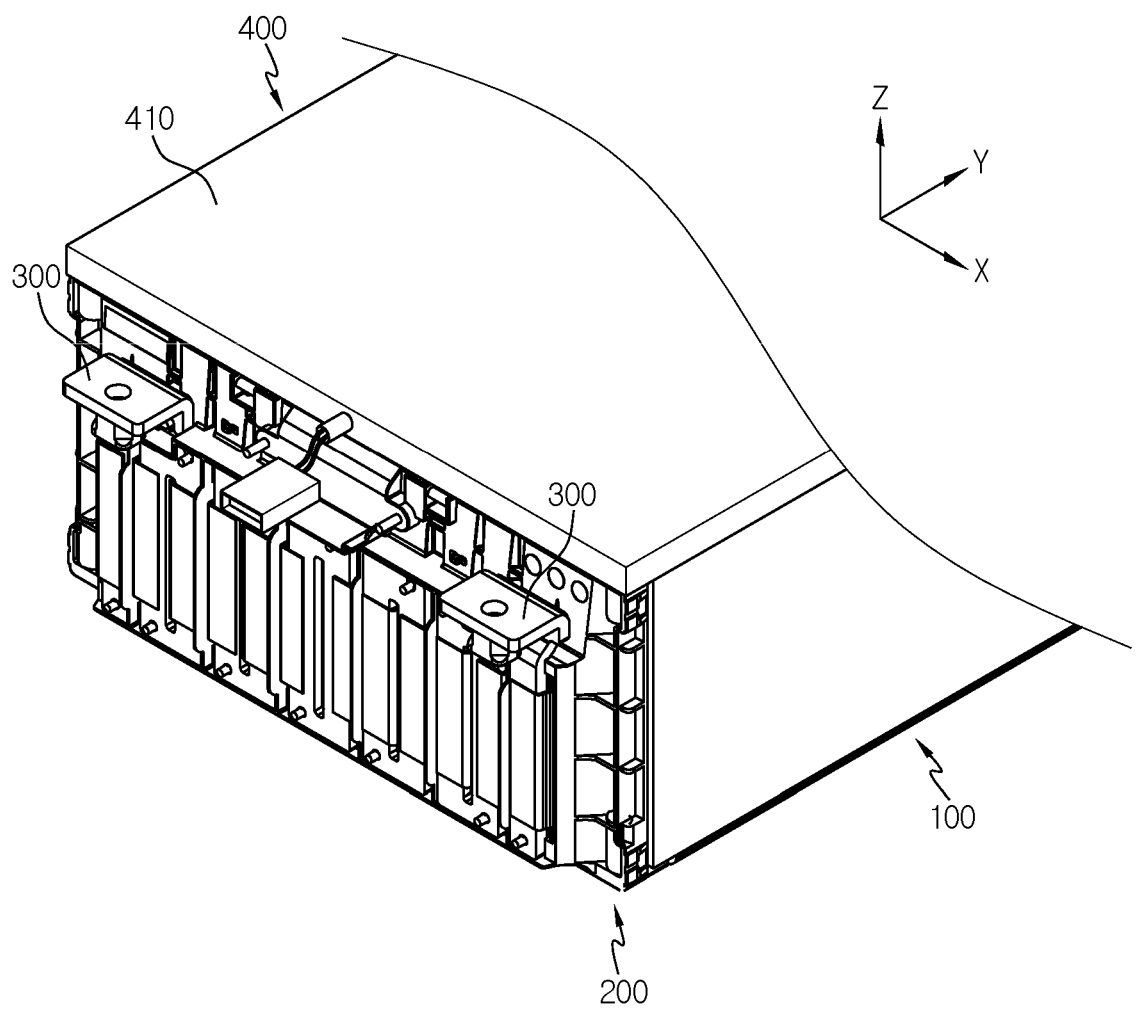
FIG. 4 is a perspective view showing the cell stack, the bus bar frame assembly and the phase change preheater coupled together according to an embodiment of the present disclosure.

Referring to FIGS. 4 and 5, the phase change preheater 400 is disposed at an upper portion of the cell stack 100 (an upper side along the Z-axis direction in FIG. 4) and contains a phase change material that causes a phase change as crystal nucleus is formed and accordingly causes an exothermic reaction.

The phase change preheater 400 prevents the performance of the battery module from deteriorating due to a low temperature by preheating the cell stack 100 disposed therebelow by means of the exothermic reaction according to the phase change.

More specifically, the phase change preheater 400 includes a pouch 410, a phase change material M, a support frame 420, a first driving unit 430, a first friction plate 440, a second friction plate 460, a connection line 470 and a connector 480.

The pouch 410 accommodates the phase change material M therein and is placed on the cell stack 100 to directly contact the cell stack 100. More specifically, the pouch 410 is in direct contact with the side portion of each battery cell 110 of the cell stack 100.

The phase change material M is a material that exists in a supersaturated solution state and causes a phase change into a solid phase by crystallization when a crystal nucleus is provided by a physical impact. The phase change process causes an exothermic reaction, and the heat generated according to the exothermic reaction is conducted through the pouch 410 and used to preheat the cell stack 100 disposed below the phase change preheater 400.

As the phase change material M, for example, a supersaturated solution including at least one of a sodium hydroxide supersaturated solution, a sodium acetate supersaturated solution and a sodium thiosulfate supersaturated solution may be used. As explained later, if fine metal particles are provided into the supersaturated solution by a physical impact, the supersaturated solution is crystallized using the metal particles as crystal nuclei, and as a result crystals are generated so that the supersaturated solution in the pouch is phase-changed into a solid state.

In addition, if the supersaturated solution phase-changed into a solid phase is heated to a temperature of about 59° C. or higher, the supersaturated solution is phase-changed again into a liquid state by an endothermic reaction, and in this state, the cell stack 100 may be preheated. The battery module according to an embodiment of the present disclosure may be used in a vehicle such as a HEV, a PHEV and a BEV, and the energy required to phase-change the phase change preheater 400 into an original state again after the exothermic reaction is completed may be obtained using the heat generated by using the battery module while the vehicle is running. In addition, if the vehicle travels a relatively short distance and thus the heat required for completing the exothermic reaction so that the phase change preheater 400 phase-changed into a solid state is phase-changed again into an original state is not sufficiently obtained, an additional heat source is required. This will be described later in detail while explaining a battery module according to another embodiment of the present disclosure.

The support frame 420 penetrates the pouch 410 partially, and accordingly the support frame 420 is partially located inside the pouch 410 and partially located outside of the pouch 410. The support frame 420 includes a first support frame 421 and a second support frame 422, which are formed by dividing one end of the support frame into two parts. The first support frame 421 and the second support frame 422 are located inside the pouch 410.

The first driving unit 430 is fixed to an end of the first support frame 421. The first driving unit 430 may be a motor. The first friction plate 440 may be attached to the first driving unit 430 to rotate as the first driving unit 430 is driven.

The second friction plate 460 is fixed to an end of the second support frame 422 to come into surface contact with the first friction plate 440. Thus, as the first driving unit 430 is driven, the contact surfaces of the first friction plate 440 and the second friction plate 460 may cause friction with each other to form fine metal particles. That is, both the first friction plate 440 and the second friction plate 460 are made of a metal material, and the fine metal particles formed as above act as metal crystal nuclei to cause a phase change.

Meanwhile, referring to FIG. 6, unlike FIG. 5, the second friction plate 460 is not fixed to the second support frame 422 but is attached to a second driving unit 450 that is fixed to the second support frame 422. Similar to the first driving unit 430, the second driving unit 450 may also be a motor. If both the first friction plate 440 and the second friction plate 460 cause friction in a rotating manner as described above, metal crystal nuclei may be formed more easily, and thus an exothermic reaction according to the phase change may be more quickly derived.

Referring to FIGS. 4 to 6 again, the connection line 470 electrically connects the first driving unit 430 and the second driving unit 450 located inside the pouch 410 to the connector 480 located outside of the pouch 410. The connection line 470 may extend through the support frame 420.

The connector 480 is a component for connection to a power source for supplying power to the first driving unit 430 and the second driving unit 450, and may be, for example, connected onto a circuit line along which current flows while the vehicle is in a key-on state. In this case, when a user keys on to start the vehicle, the first driving unit 430 and the second driving unit 450 may be driven by power supplied through the battery module according to an embodiment of the present disclosure or another battery separately installed to generate the metal crystal nuclei, and thus the battery module may be preheated. The exothermic reaction using the crystallization is not performed by an external physical impact but is performed only when the metal therein generates crystal nuclei. The metal crystal nuclei may be generated even with very small energy, and thus the power consumed therefor is not large, efficiently.

Referring to FIGS. 1 to 4 together again, the module case 500 covers peripheries of the cell stack 100 and the phase change preheater 400 in a state where the bus bar frame assembly 200 is exposed out.

The end plate 600 is provided in a pair, and each end plate 600 covers the bus bar frame assembly 200.

Next, a battery module according to another embodiment of the present disclosure will be described with reference to FIG. 7. The battery module according to another embodiment of the present disclosure further includes a film heater 700, compared to the battery module according to the former embodiment of the present disclosure described above, and other components are substantially not different.

Thus, the battery module according to another embodiment of the present disclosure will be described based on the film heater 700, and other features identical to the former embodiment will not be described in detail.

Figure 7:
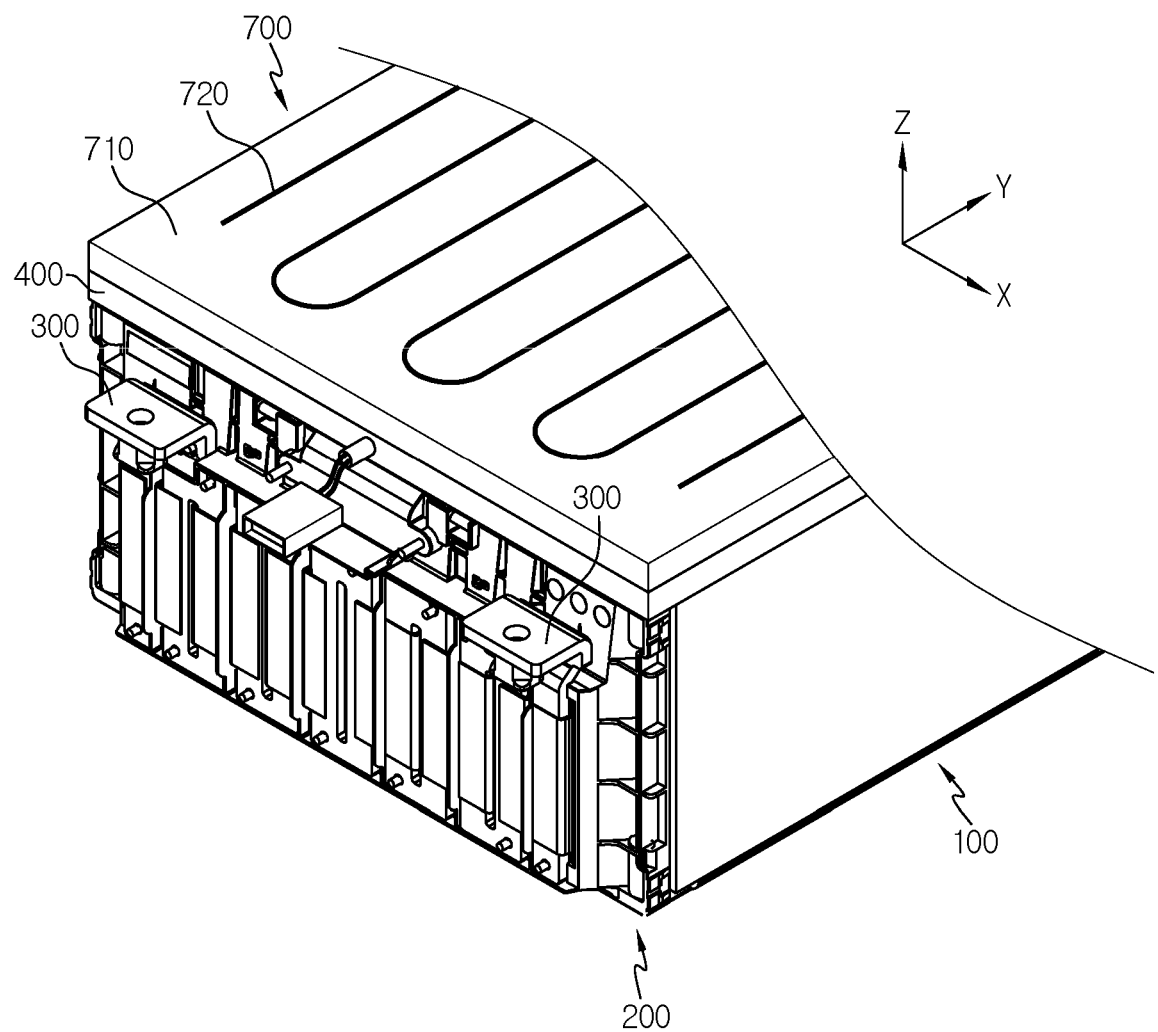
FIG. 7 is a perspective view showing some components employed by a battery module according to another embodiment of the present disclosure.

Referring to FIG. 7, the film heater 700 includes a film 710 disposed on the phase change preheater 400 to cover the phase change preheater 400 and a heat wire 720 embedded in the film 710. The film heater 700 is connected to an external power source to heat the phase change preheater 400. That is, the film heater 700 heats the phase change preheater 400 to a certain temperature or higher (approximately 59° C. or higher) to phase-change the phase change preheater 400 from a liquid phase into a solid phase and to phase-change the phase change preheater 400 into a liquid phase again after the exothermic reaction is completed.

Since the battery module is in use while the vehicle is running, sufficient heat is normally generated, so the phase change preheater 400, which has phase-changed from a liquid phase into a solid phase before the vehicle starts, is phase-changed again into a liquid phase while the vehicle is running. However, if the vehicle travels an insufficient distance or repeats running and starting-off at short intervals, the temperature of the battery module may not rise sufficiently, so that the phase change preheater 400 may be kept in a solid state without being phase-changed into a liquid state.

Therefore, when the vehicle, namely the battery module, is charged, the film heater 700 may be connected to a charger and driven with the power supplied therefrom to heat the phase change preheater 400 so that the temperature of the phase change material M inside the phase change preheater 400 rises to about 59° C. or higher. If the temperature rises as above, the phase change preheater 400 may be phase-changed again into a liquid phase, and thus it is ready to preheat the battery module.

Meanwhile, a battery pack according to an embodiment of the present disclosure may be implemented to include at least one battery module according to an embodiment of the present disclosure as described above. In addition, a vehicle according to an embodiment of the present disclosure may be implemented to include the battery pack according to an embodiment of the present disclosure as described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
a cell stack having a plurality of battery cells;

a phase change preheater disposed on the cell stack and containing a phase change material that changes phase as a crystal nucleus is formed therein, thereby causing an exothermic reaction; and a film heater disposed on the phase change preheater, wherein the phase change preheater is disposed outside the cell stack in between the film heater and the cell stack wherein the phase change preheater includes:
a pouch located on the cell stack;
the phase change material contained in the pouch;
a first driving unit located in the pouch;
a first friction plate attached to the first driving unit; and
a second friction plate configured to form the crystal nucleus in the form of a metal crystal nucleus by causing friction with the first friction plate as the first driving unit is driven.

2. The battery module according to claim 1, wherein the phase change material includes at least one solution selected from the group consisting of: a sodium hydroxide supersaturated solution, a sodium acetate supersaturated solution, and a sodium thiosulfate supersaturated solution.

3. The battery module according to claim 1, wherein the phase change preheater further includes a connector located outside of the pouch, the connector being electrically connected to the first driving unit.

4. The battery module according to claim 1, wherein the phase change preheater further includes a support frame positioned at least partially within the pouch and configured to support the first driving unit and the second friction plate.

5. The battery module according to claim 1, wherein the phase change preheater further includes a second driving unit located in the pouch and attached to the second friction plate.

6. The battery module according to claim 5, wherein the phase change preheater further includes a connector located outside of the pouch, the connector being electrically connected to the first driving unit and the second driving unit.

7. The battery module according to claim 5, wherein the phase change preheater further includes a support frame positioned at least partially within the pouch and configured to support the first driving unit and the second driving unit.

8. The battery module according to claim 1, wherein the film heater is connected to an external power source to heat the phase change preheater so that the phase change material phase-changed into a solid state is phase-changed into a liquid state again.

9. The battery module according to claim 1, further comprising:
a pair of bus bar frame assemblies including a pair of bus bar frames and a plurality of bus bars, each of the bus bar frames configured to cover a respective longitudinal end of the cell stack, and each of the bus bars being fixed onto a respective one of the bus bar frames and electrically connected to the battery cells.

10. The battery module according to claim 9, further comprising:

a module case configured to cover peripheries of the cell stack and the phase change preheater while leaving the pair of bus bar frame assemblies exposed outwardly.

11. The battery module according to claim 9, further comprising:
a pair of end plates each configured to cover a respective one of the pair of bus bar frame assemblies.

12. A battery pack, comprising the battery module according to claim 1.

13. A vehicle, comprising the battery module according to claim 1.

14. A battery module, comprising:
a cell stack having a plurality of battery cells; and
a phase change preheater disposed on the cell stack and containing a phase change material that changes phase as a crystal nucleus is formed therein, thereby causing an exothermic reaction, wherein the phase change preheater includes:
a pouch located on the cell stack;
the phase change material contained in the pouch;
a first driving unit located in the pouch;
a first friction plate attached to the first driving unit; and
a second friction plate configured to form the crystal nucleus in the form of a metal crystal nucleus by causing friction with the first friction plate as the first driving unit is driven.

15. The battery module according to claim 14, wherein the phase change preheater further includes a connector located outside of the pouch, the connector being electrically connected to the first driving unit.

16. The battery module according to claim 14, wherein the phase change preheater further includes a support frame positioned at least partially within the pouch and configured to support the first driving unit and the second friction plate.

17. A battery module, comprising:
a cell stack having a plurality of battery cells; and
a phase change preheater disposed on the cell stack and containing a phase change material that changes phase as a crystal nucleus is formed therein, thereby causing an exothermic reaction, wherein the phase change preheater includes:
a pouch;
the phase change material contained in the pouch;
a first driving unit located in the pouch;
a first friction plate attached to the first driving unit;
a second driving unit located in the pouch; and
a second friction plate attached to the second driving unit and configured to form the crystal nucleus in the form of a metal crystal nucleus by causing friction with the first friction plate as the first driving unit and the second driving unit are driven.

18. The battery module according to claim 17, wherein the phase change preheater further includes a connector located outside of the pouch, the connector being electrically connected to the first driving unit and the second driving unit.

19. The battery module according to claim 17, wherein the phase change preheater further includes a support frame positioned at least partially within the pouch and configured to support the first driving unit and the second driving unit.

\* \* \* \* \*